UNITED STATES PATENT OFFICE.

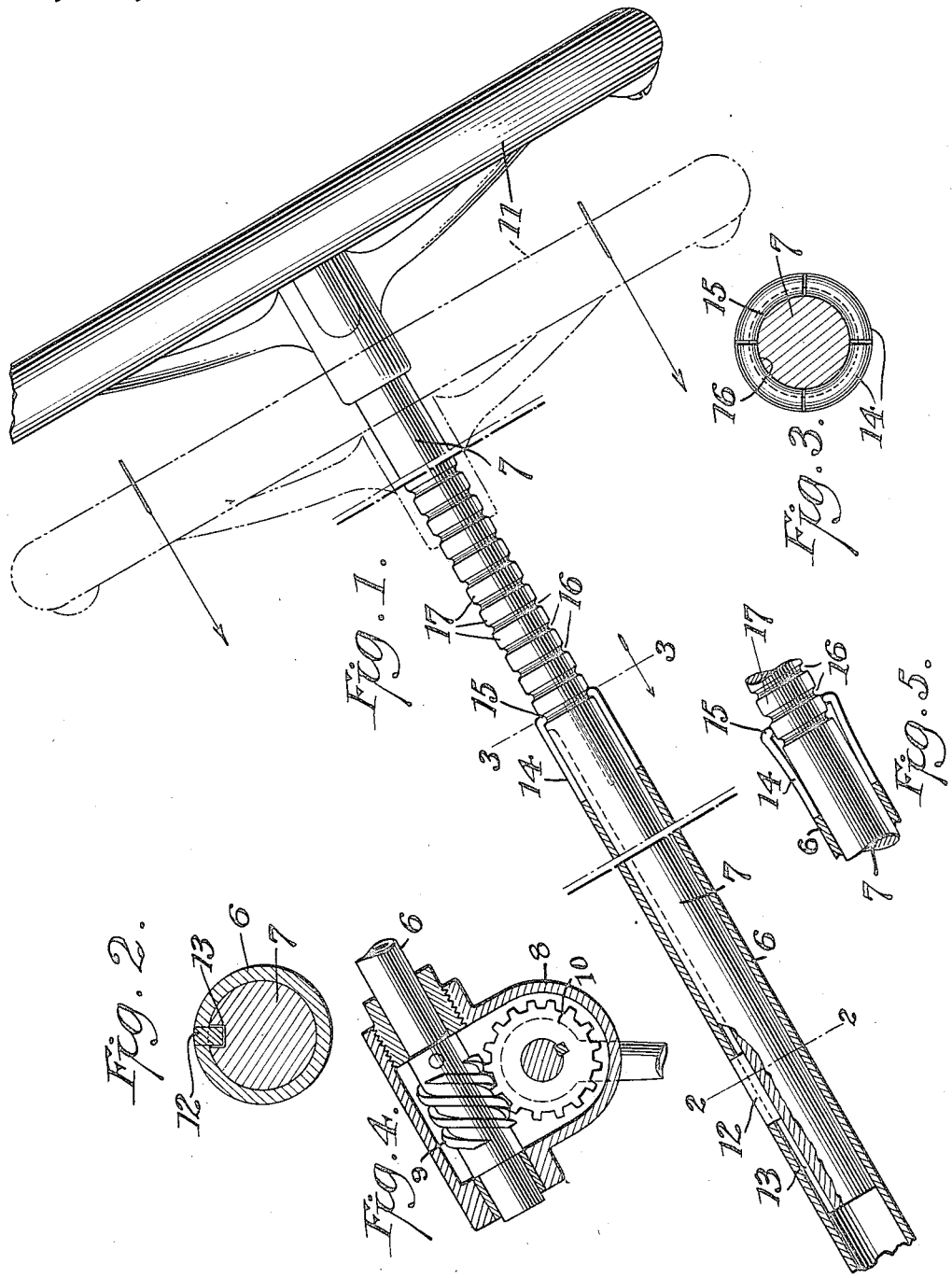

WILLARD IRVING TWOMBLY, OF NEW YORK, N. Y., ASSIGNOR TO TWOMBLY CAR CORPORATION, OF NEW YORK, N. Y., A CORPORATION OF NEW YORK.

STEERING MECHANISM.

1,225,289.    Specification of Letters Patent.    Patented May 8, 1917.

Application filed October 15, 1913. Serial No. 795,199.

*To all whom it may concern:*

Be it known that I, WILLARD IRVING TWOMBLY, a citizen of the United States, residing in the city, county, and State of New York, have invented new and useful Improvements in Steering Mechanism, of which the following is a specification.

This invention relates to steering mechanism for vehicles, motor boats and the like, in which a rotatable post or spindle having a hand wheel fixed thereto is connected to the steering mechanism to actuate the same, and relates particularly to the steering post.

In motor vehicles in order that the steering wheel will be in position to be conveniently handled by the driver the post is of such length that the wheel is located in close proximity to the seat with result that it is inconvenient for the driver to get into the seat. Should the steering post be located at the right hand side of the vehicle and it is desired that someone occupy the seat beside the driver it is necessary for such person to go around the opposite side of the vehicle from that on which the steering post is located in order to get into the vehicle. This is very inconvenient and especially dangerous in thoroughfares where there is considerable traffic. Furthermore, while the steering wheel may be located conveniently for one driver it will be inconvenient for others, since should the steering post be short it would require a tall person to bend or stoop over, and should the steering post be long and located close to the seat it would be inconvenient for a short person to handle. This is also true in motor boats and other vehicles. It is the object of the present invention to overcome the above disadvantages and for this purpose I provide a steering post which is axially adjustable.

In carrying out the invention I provide a post consisting of telescoping sections, one section being mounted to rotate in a fixed poistion and connected to the steering mechanism through a worm and worm wheel, or a pinion and gear or gear segment, while the other section having the steering wheel fixed thereto is axially movable, said fixed and movable sections having means to automatically coöperate to lock the post sections in any adjusted position, and unlocked when an axial push or pull is applied to the post through the steering wheel.

In the drawing accompanying and forming a part of this specification, Figure 1 is a side elevation, partly in section, illustrating an embodiment of my invention, the dotted line position of the hand wheel indicating one of the positions to which it may be adjusted.

Fig. 2 is a sectional end view taken on the line 2—2 of Fig. 1.

Fig. 3 is a sectional end view taken on the line 3—3 of Fig. 1, looking in the direction of the arrows.

Fig. 4 is a side elevation of the lower end of the post to illustrate a manner of connecting it to the steering mechanism of a vehicle, motor boat or the like; and Fig. 5 is a side elevation, partly in section, to illustrate the action of the post sections when the post is being adjusted.

Similar characters of reference designate like parts throughout the different views of the drawing.

The embodiment of my invention in the steering post illustrated in the drawing consists of telescoping sections 6 and 7, the section 6 being tubular and in the present instance circular in cross section. This section 6 is mounted to rotate in a fixed position, as in a bracket 8, which is fixed to the framework of the vehicle, motor boat or the like, and is operatively connected adjacent its lower end to the steering mechanism, in the present instance shown as a worm 9 on said post section meshing with worm wheel 10 of the steering mechanism, although it will be understood that this connection may consist of any suitable gearing, such as a bevel pinion on the steering post meshing with a bevel gear or gear segment. The other post section 7 has a telescoping connection with the section 6, and consists of a spindle having a hand wheel 11 fixed thereto and slidably engaging in the post section 6. To rotate the tubular post section as the section 7 is rotated by the hand wheel 11 and thereby actuate or operate the steering mechanism, the tubular section is provided with a key 12 engaging in a longitudinal recess 13 in the telescoping spindle 7, thus not only coupling the two post sections so that they will rotate together but also permitting longitudinal or axial movement of the spindle 7.

To lock the spindle or post section 7 in adjusted positions the free end of the tubular section 6 is split longitudinally to provide transverse slots and thereby provide resilient fingers 14 which are adapted to be sprung outward or laterally, but the normal tension of which will tend to normally maintain them in a plane with the walls of the main portion of the tubular section 6. The ends of the fingers are bent inwardly, as at 15, which may be done before the tube is split, to provide an annular shoulder or flange to engage in either one of a series of axially spaced apart annular grooves or recesses 16 in the spindle or post section 7, such engagement of the flanges 15 in said grooves retain and firmly lock the post 7 against accidental longitudinal movement in the tubular section 6.

To adjust the post to decrease the length thereof it is only necessary to apply a downward pressure on the wheel 11 pushing it downward, this pressure causing the resilient finger flanges 15 to ride over the edges of the ridges 17 between the annular grooves 16 causing the fingers to expand and ride along the ridges 17, as shown in Fig. 5, and engage in the succeeding groove or grooves. When it is desired to lengthen the post all that is necessary is to exert a pull on the hand wheel 11 when the operation of the resilient fingers will be repeated.

It will be obvious that when the driver gets into the vehicle it will only be necessary to push downward on the hand wheel 11 thereby decreasing the length of the post and move the hand wheel away from the seat; or this operation may be performed when the driver gets out of the vehicle, and when he again takes his seat it is only necessary for him to exert a pull on the hand wheel to adjust the post to any position he may desire and find most convenient for him.

Variations may be resorted to within the scope of my invention.

Having thus described my invention, I claim:

1. The combination with steering mechanism, of a rotatable post consisting of a pair of sections, one section mounted to rotate in a fixed position and operatively connected to the steering mechanism, and the other section having a telescoping movement into and rotatable with the fixed section; a plurality of axially spaced recesses in the inner post section; and spring fingers integral with the outer section adapted to engage substantially the entire circumference of either one of said recesses to retain the post sections in adjusted position, and said fingers adapted to be thrown out of engagement with said recesses by an axial push or pull on the post, substantially as and for the purpose specified.

2. The combination with steering mechanism, of a longitudinal adjustable rotatable post consisting of a section operatively connected to the steering mechanism and a section to have telescoping movement into the tubular section and bodily removable therefrom; a key fixed in the outer section to slidably engage in a groove in the inner section whereby one section is rotatable with the other; integral spring fingers formed at the free end of the walls of the tubular section; and recesses in the telescoping section for the engagement of said fingers, substantially as and for the purpose specified.

3. The combination with steering mechanism, of an adjustable rotatable post consisting of a tubular section operatively connected to the steering mechanism and having integral resilient fingers with inwardly turned flanges substantially encircling its free end and tensioned to spring inward, and a section to have telescoping movement into and rotatable with the tubular section, said telescoping section having a series of axially spaced apart annular recesses in which the finger flanges of the tubular section are adapted to engage to retain the post sections in adjusted position in normal use, and adapted to be thrown out of engagement with said recesses when subjected to abnormal axial pressure for the purpose specified.

4. The combination with steering mechanism, of an adjustable rotatable post consisting of a tubular section mounted to rotate in a fixed position and operatively connected to the steering mechanism, transverse slots in the free end of said tubular section to provide resilient fingers, said fingers having inwardly projecting flanges, and a post section having a hand wheel fixed thereto slidably engaging in the tubular section, a series of annular grooves in said post section in either one of which the resilient finger flanges of the tubular post are adapted to engage to lock said post section in adjusted position, said resilient fingers adapted to be sprung out of operative engagement with the annular grooves to unlock the post section when an axial pressure or pull is applied to the slidable post section, a longitudinal groove in the slidable post section, and a key fixed in the tubular post section to engage in said groove to rotatably connect the post sections and permit adjustment thereof.
5. An axially adjustable steering wheel pillar, comprising a tubular post fixed to the steering reduction groove mechanism, a movable post telescoping therein and fixed to the steering wheel and adapted to be axially removed from said fixed tubular section, a key interior to the tubular section and a longitudinal groove in engagement therewith extending from one end of said adjustable post toward the middle of said post, a series of spaced circumferential grooves on said adjustable post from a point adjacent the end of said longitudinal groove to a point adjacent to said steering hand-wheel, a yielding clip at the free end of said tubular section substantially surrounding the adjustable post and adapted to engage any of said circumferential grooves about their circumference, whereby said post is held against axial movement under normal pressure and may be readily displaced for quick adjustment by abnormal axial pressure.

WILLARD IRVING TWOMBLY.

Witnesses:
J. O. SEIFERT,
LAURA E. SMITH.